United States Patent
Rittmueller et al.

[11] Patent Number: 6,016,346
[45] Date of Patent: Jan. 18, 2000

[54] LOW-PROFILE SPEAKERPHONE WITH DOWNWARD ORIENTED MICROPHONE CONFIGURATION

[75] Inventors: Stephen P. Rittmueller, Chicago; Frank J. Annerino, Rolling Meadows, both of Ill.; Mark R. Dreher, Boulder, Colo.; Scott A. Chastain, Foster, Calif.

[73] Assignee: 3Com Corporation, Santa Clara, Calif.

[21] Appl. No.: 08/955,053

[22] Filed: Oct. 21, 1997

[51] Int. Cl.[7] .................................................. H04M 1/00
[52] U.S. Cl. ........................................ 379/420; 379/428
[58] Field of Search ................................. 379/420, 428, 379/444, 443; 381/386, 355, 345, 160, 344

[56] References Cited

U.S. PATENT DOCUMENTS

| | | |
|---|---|---|
| 2,230,104 | 1/1941 | Bostwick . |
| 2,763,730 | 9/1956 | Paull et al. . |
| 2,976,373 | 3/1961 | Uchida . |
| 3,069,508 | 12/1962 | Boeryd et al. . |
| 4,078,155 | 3/1978 | Botros et al. . |
| 4,434,507 | 2/1984 | Thomas . |
| 4,436,966 | 3/1984 | Botros . |
| 4,620,317 | 10/1986 | Anderson . |
| 4,831,656 | 5/1989 | Southern et al. . |
| 5,138,651 | 8/1992 | Sudo . |
| 5,321,848 | 6/1994 | Miyahira et al. ............... 455/66 |

FOREIGN PATENT DOCUMENTS

| | | | |
|---|---|---|---|
| 2101449 | 1/1983 | United Kingdom | 381/160 |

OTHER PUBLICATIONS

Toshimasa Fujita et al., "Model S–1P Loudspeaker Telephone Set Design and Construction," Review of the Electrical Communication Laboratories, vol. 27, Numbers 5–6 (May–Jun. 1979), p. 372.

*Primary Examiner*—Jack Chiang
*Attorney, Agent, or Firm*—McDonnell Boehnen Hulbert & Berghoff

[57] ABSTRACT

The invention provides a speakerphone having a low-profile housing having an upward-oriented speaker on an upper surface of the housing and a downward-oriented microphone on a lower surface of the housing. The lower surface of the housing is domed, for example, a parabolic dome, enabling a low opening distance between the housing and a support surface on which the speakerphone rests, in turn, enabling a low housing profile. The speaker is retained by an elastic rubber cup member.

11 Claims, 3 Drawing Sheets

LOW-PROFILE SPEAKERPHONE WITH DOWNWARD ORIENTED MICROPHONE CONFIGURATION

BACKGROUND OF THE INVENTION

1. Field of the Invention

This invention relates to speakerphones useful in teleconferencing applications.

2. Brief Description of the Related Art

Speakerphones are often used in a conference room setting, with conference call participants seated around a table, and generally include at least one speaker and at least one microphone. Speakerphone units are generally configured with the speaker(s) oriented to provide adequate sound quality in a 360° range, so that the sound quality perceived by conference call participants is not diminished at certain locations in the room or around the conference table. Likewise, the microphone(s) are oriented to provide 360° sound pick-up, so that any differences in signal level and quality as participants speak from different parts of the room or at different locations around a conference table are minimized.

One configuration that has previously been used in an attempt to achieve these goals includes a speaker and a microphone co-axially aligned with a vertical axis of the speakerphone unit. In this configuration, the microphone and the speaker are oriented in opposite directions, i.e., the microphone upwards and the speaker downwards or vice versa. U.S. Pat. No. 3,069,508 shows a telephone instrument having a top-mounted, upward-oriented microphone and a downward-oriented speaker mounted on the bottom of the speakerphone unit. Sound output from the speaker exits the housing through apertures in the sides of the unit. Likewise, a second set of apertures in the housing allow for passage of sound waves into the housing to the microphone. An insulating disc separates the speaker from the microphone to prevent the direct transmission of sound waves from the speaker to the microphone.

Prior art units with this configuration have an upright profile, to the extent that the sight-lines of the participants around the conference table may be blocked by the speakerphone unit, to the distraction of the conference call participants. Additionally, prior art speakerphones with a downward-oriented microphone mounted on the lower side of the speakerphone unit are known. For example, U.S. Pat. No. 4,078,155 shows a speakerphone having a cylindrical housing and including a downward-oriented, omni-directional microphone mounted at the apex of an inverted conical section, the sloped surface of which rises at a 30° angle from the horizontal. The conical section is surrounded by a large cavity, encircling the microphone, that rises vertically for some distance. A diaphragm separates the speaker from the microphone. U.S. Pat. No. 4,831,656 shows a similar structure, with a microphone mounted at the apex of a 22° cone.

A readily apparent disadvantage of this design is that the open cavity surrounding the microphone extends vertically for some distance, in turn causing the entire unit to be tall and obtrusive. As discussed above, speakerphones having a tall unit profile are obtrusive and distracting to conference call participants. It would, therefore, be desirable to have an improved speakerphone.

SUMMARY OF THE INVENTION

Therefore, it is an object of the present invention to provide an esthetically attractive speakerphone having a low unit profile, so as not to interfere with the sight lines of participants seated around the conference table.

Another object of the invention is to provide a speakerphone providing good sound quality in a 360° range around the speaker unit and good sound transmission quality in a 360° range around the microphone.

A further object of the invention is to provide a low-profile speakerphone while minimizing reflective nulls and other deleterious acoustic effects that would interfere with the quality of the sound transmitted to the microphone.

Another object of the invention is to provide a speakerphone having good performance characteristics as to quality of the sound transmitted by the speaker and the sound picked up by microphone while maintaining a low profile for the speakerphone unit.

A further object of the invention is to provide a speakerphone exhibiting a substantially flat frequency response while maintaining an esthetically attractive low-profile speakerphone housing.

The present invention achieves these and other objects by providing a speakerphone assembly having an upward-oriented speaker mounted above a downward-oriented microphone, and a speakerphone housing having a lower surface specially adapted to focus sound waves into the microphone. The combination of the shape of the lower surface of the speakerphone housing, and the location of the microphone on the lower surface provides means to focus the sound waves into the microphone, allowing for adequate quality sound transmitted to the microphone while minimizing reflective nulls and other sound artifacts that interfere with sound transmission to the microphone.

The invention, therefore, provides a functional and esthetically attractive lowprofile speakerphone, comprising a housing having an upper surface and a lower surface, with respect to a support surface such as a desk, table or any similar hard, flat surface. The lower surface of the speakerphone housing has an upwardly domed configuration, and the housing is spaced from the support surface by support members. A speaker is enclosed by a speaker retaining cup and speaker mounting frame and is situated to direct its output upwards through the upper surface of the housing. A downward-oriented microphone is located on the lower surface of the housing, located substantially at the highest point of the domed lower surface.

DETAILED DESCRIPTION OF THE DRAWINGS AND PREFERRED EMBODIMENTS

Figure 1:
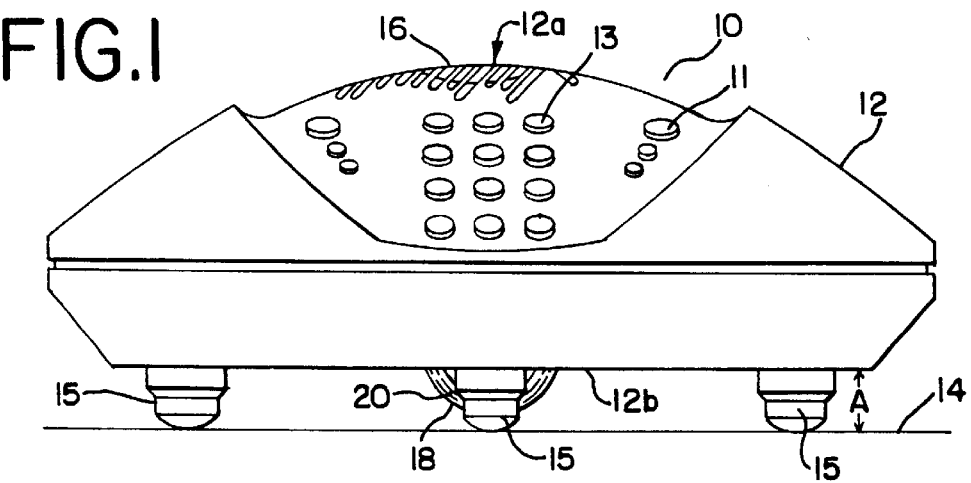
FIG. 1 is a side view of a preferred embodiment of a low-profile speakerphone having a downward-oriented microphone configuration.

FIG. 1 depicts a preferred embodiment of the invention, wherein a speakerphone 10 includes a housing 12. The housing 12 has an upper surface 12a and a lower surface 12b, with respect to a support surface 14, such as a table top or other such hard surface. The housing 12 is supported by and spaced from the support surface 14 by support members 15. In a preferred embodiment, the support members 15 are three legs, equally spaced about the perimeter of the lower surface 12b to support the speakerphone 10 and maintain proper spacing between the lower surface 12b and the support surface 14. The upper surface 12a includes a speaker grill 16 or other suitable covering placed directly over a conventional speaker (not shown). Control means such as buttons 13 for dialing the telephone and other controls 11, such as volume controls, are also located on the upper surface 12a. In a preferred embodiment, the upper surface 12a is curved to provide an esthetically attractive shape to the housing 12. It is intended, however, that the housing 12 may take other shapes as well.

Internally, the housing 12 is divided substantially into an upper portion that contains the speaker and a lower portion that contains a microphone 20. A microphone mounting cover 18, which contains the microphone 20, is removably attached to the lower surface 12b. The upper portion is separated from the lower portion by a barrier, such as a circuit board, although other barriers are appropriate. The barrier preferably acts to insulate the lower portion and the microphone 20 from the speaker, and vice versa. Additionally, the speaker is further contained by a retaining cup that acts to insulate the microphone 20 from the speaker sound output.

Figure 2:
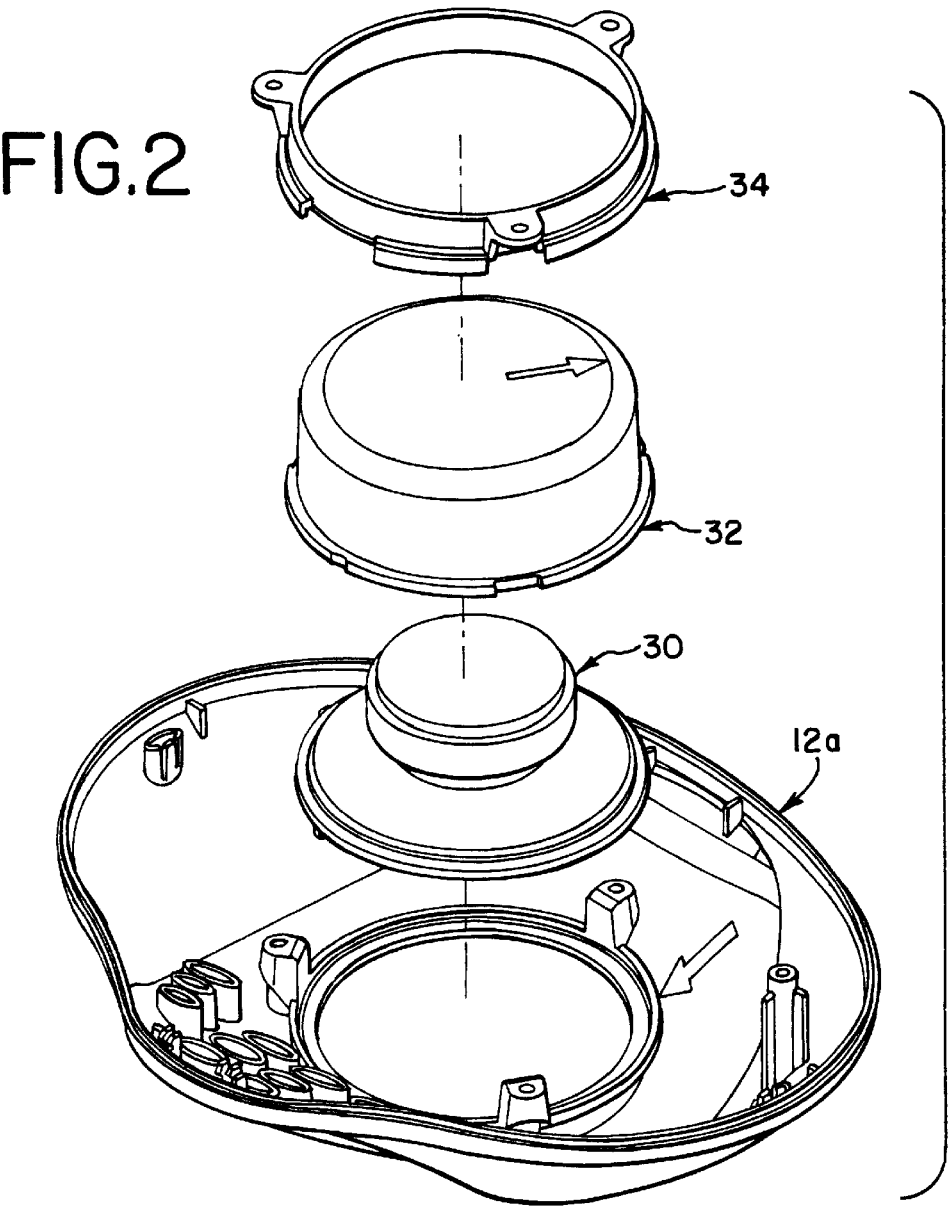
FIG. 2 is an exploded view of a preferred embodiment of a speaker mounting system.

A preferred arrangement of the speaker-retaining cup is depicted in FIG. 2. The speaker 30 is mounted to the internal side of the upper surface 12a of the housing 12, and is enclosed by a retaining cup 32, that is preferably formed from a thermoplastic rubber. A speaker mounting frame 34 encircles and secures the retaining cup 32 to the upper surface 12a. The speaker mounting frame 34 is attached to the internal side of the upper surface 12a by suitable means, such as bolts (not shown). The speaker retaining cup 32 encloses the entire back of the speaker 30, thus isolating the acoustic energy emitted from the back of the speaker and minimizing internal coupling between the speaker 32 and the microphone 20. Additionally, the speaker retaining cup, being made of thermoplastic rubber, acts to dampen sound emitted from the back of the speaker, thereby eliminating the need to include additional dampening material inside the speakerphone. Finally, the compliant properties of the thermoplastic rubber speaker retaining cup 32 ensure that a good seal exists around the perimeter of the speaker 30 when the speaker 30 is mounted in the speakerphone 10, thus eliminating the need for a separate speaker gasket.

Although the present invention is equally useful for a half-duplex or a full-duplex speakerphone, in the preferred embodiment, the telephonic circuitry is a full duplex speakerphone circuit. In the half-duplex, or single-talking mode, transmission of voice information takes place in a single direction only at any given time. In full-duplex or double-talking mode, transmission of voice information takes place in both directions simultaneously. Although full-duplex operation is preferred because it allows for more interactive conversations, it also causes acoustic feedback echo, because some of the sound emitted by the speaker is picked up by the microphone 20. Accordingly, when full duplex circuitry is employed, sound quality is maintained through the use of an acoustic echo control ("AEC") device, such as the AEC device described in U.S. patent application Ser. No. 08/571,710 the contents of which are incorporated herein by reference. The AEC device acts as an echo filter, reducing the echo by generating an estimate of the expected feedback and subtracting this estimate from the signal produced by the microphone before transmitting the signal.

Figure 3:
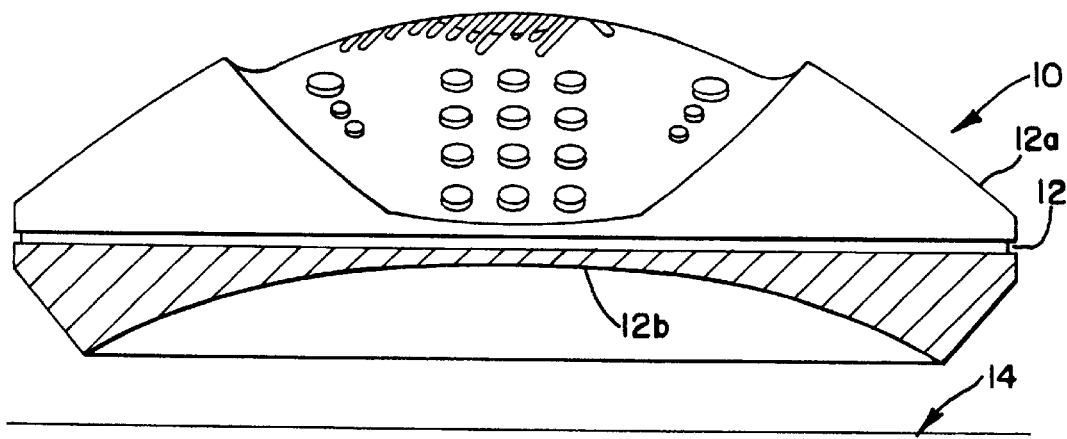
FIG. 3 is a side view of a preferred embodiment of the invention, in which a lower portion is shown in partial cross-section to show the profile of the long axis of a domed lower surface of the speakerphone housing, the partial cross-section of the lower portion taken along line 2—2 as shown in FIG. 5.
Figure 4:
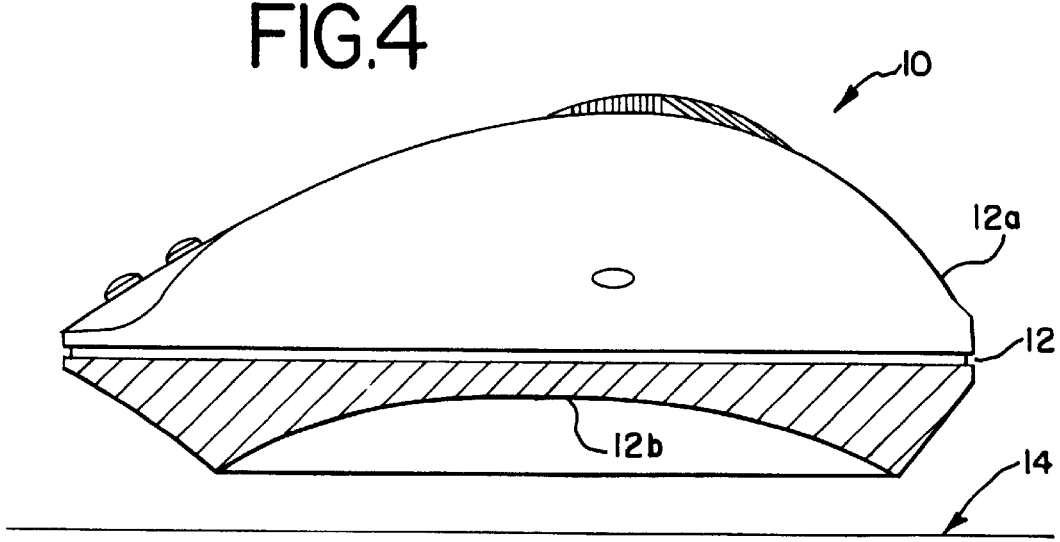
FIG. 4 is a side view of a preferred embodiment of the invention, in which a lower portion is shown in partial cross-section to show the profile of the short axis of the domed lower surface of the speakerphone housing, the partial cross-section of the lower portion taken along line 3—3 as shown in FIG. 5.

As shown in FIGS. 3 and 4, the lower surface 12b is a substantially parabolic dome, curving upwards away from the support surface 14. The lower surface 12b may have an oval perimeter, in which case the parabolic dome is not perfectly symmetrical and, therefore, two different equations are required to define the parabolic dome. In a preferred embodiment, the domed parabolic lower surface 12b is defined by the following equations: for the x-axis, i.e., the long horizontal axis of the lower surface shown in FIG. 3, $y=x^2/25.26"$, and for the y-axis, i.e., the short horizontal axis of the lower surface shown in FIG. 4, $y=x^2/12.32"$. Other parabolic or otherwise domed shapes may be appropriate.

FIG. 3 depicts the lower surface 12b in partial cross-section, taken along the x-axis, or long horizontal axis of the lower surface 12b, with the support members 15 and the microphone mounting cover 18 and microphone 20 removed to clearly illustrate the shape of the lower surface 12b. Likewise, FIG. 4 depicts the lower surface 12b in partial cross-section, taken along the y-axis, or short horizontal axis of the lower surface 12b, again with the support members 15, the microphone mounting cover 18 and microphone 20 removed for clarity. FIGS. 3 and 4 illustrate the upward curved, parabolic dome profile of the lower surface 12b.

Figure 5:
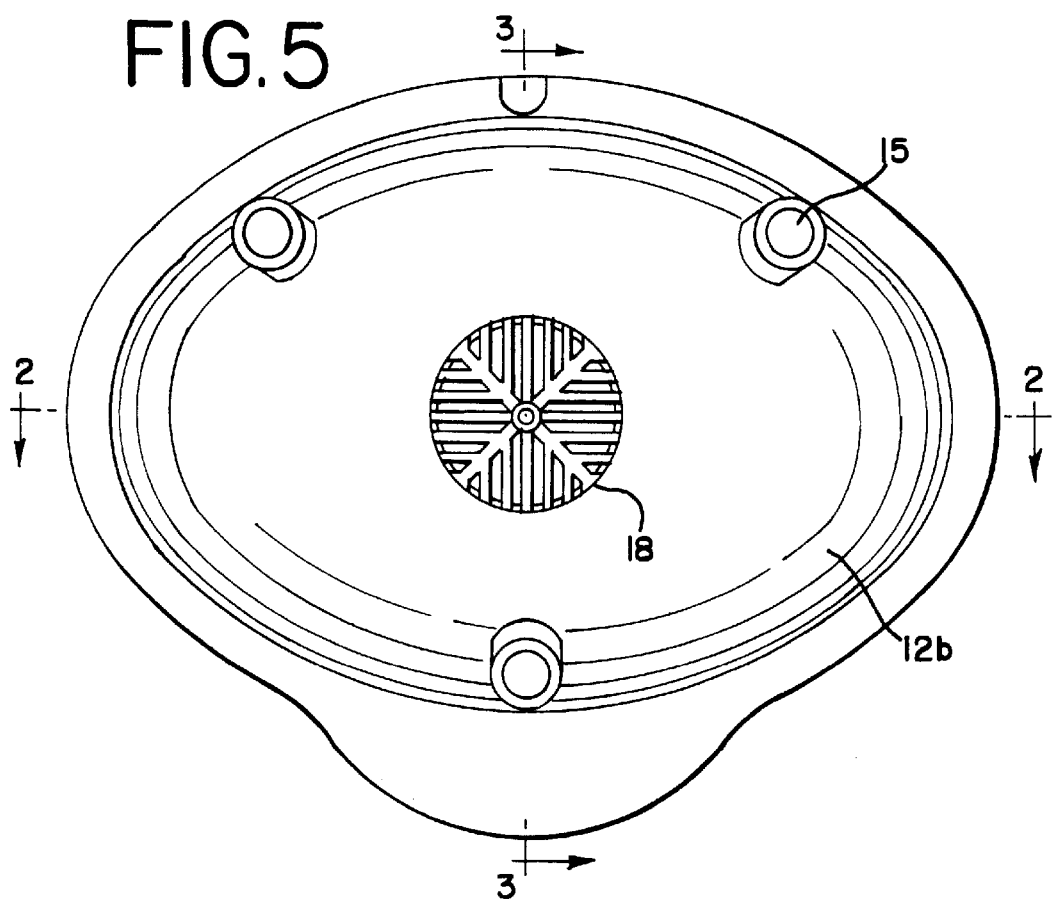
FIG. 5 is a detailed view of a lower surface of a preferred embodiment of the invention, showing a preferred microphone mounting configuration.

Referring to FIG. 5, the microphone 20 is located at substantially the highest point of the parabolic dome-shaped lower surface 12b. The parabolic domed shape of the lower surface 12b acts to focus reflected incident sound waves into the microphone 20, enhancing the performance of the microphone 20, and minimizing the spacing between the support surface 14 and the housing 12, without interfering with sound pick up by the microphone 20. This minimal spacing, indicated by the distance A, which is shown in FIG. 1, also minimizes the overall height of the speakerphone unit 10, thereby reducing interference with eye contact among the conference call participants.

The microphone mounting cover 18 covers and protects the microphone 20. The microphone mounting cover 18 is depicted in FIG. 4 as a substantially hemispherical cage, although other configurations may be appropriate. The microphone mounting cover 18 is affixed to the lower surface 12b by appropriate means, such as snap-fit tabs and slots. The mounting cover 18 is preferably made from a material that is acoustically transparent in the frequency range used in telephonic applications, typically taken to be 300 to 3,400 cycles per second.

Preferably, the lower surface 12b is textured, for example, having randomly-oriented, minute peaks and valleys of approximately 0.0015" depth, substantially over the entire lower surface 12b. The texturing may be done according to MoldTech #MT-11020. The textured lower surface 12b slightly diffuses the reflected sound, shifting the phase of some of the reflected sound waves, minimizing reflective nulls that would otherwise interfere with the quality of the sound received by the microphone 20. The combination of the support surface 14, the parabolic domed lower surface 12b and, preferably, the texture on the lower surface 12b cooperatively focus incident sound waves into the microphone 20, enhancing the quality of sound received by the microphone 20, allowing for the low opening distance A. In a preferred embodiment, the distance A is approximately ⅜" to ½".

Figure 6:
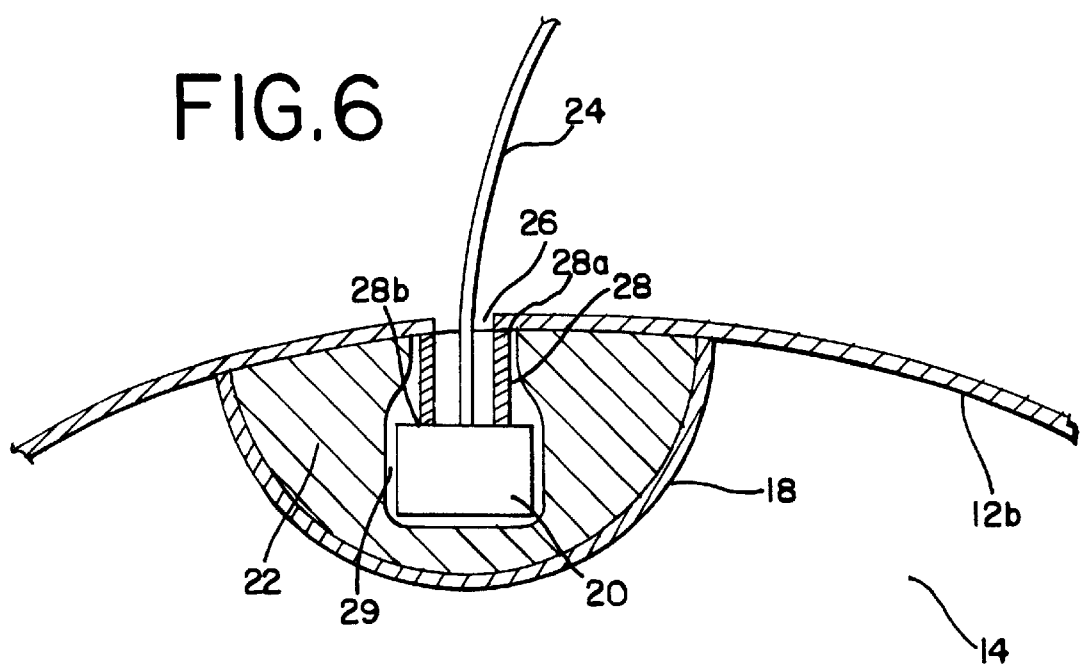
FIG. 6 is a partial cross-sectional view of the microphone mounting configuration taken along line 2—2 as shown in FIG. 5.

FIG. 6 is a partial cross sectional view, taken along the x-axis of the lower surface 12b, showing the microphone mounting assembly in cross-section. A microphone cable 24 that connects the microphone 20 to the telephonic circuit runs to the outside of the housing 12b, passing through an opening 26 as shown in FIG. 5. The microphone 20 is spaced from the lower surface 12b by a hollow, semi-rigid, preferably plastic, tube 28 through which the microphone cable 24 passes, the tube having an inner end 28a and an outer end 28b. The tube 28 may also be referred to herein as a spacer. The diameter of the tube 28 is slightly larger than that of the opening 26. The inner end 28a of the tube 28 contacts the external side of the lower surface 12b and the outer end 28b of the tube 28 contacts the back of the microphone 20, spacing the microphone 20 from the lower surface 12b by a length equal to that of the tube 28.

As shown in FIG. 6, the microphone 20 is mounted such that it is not rigidly affixed to the housing 12. Instead, the microphone 20 is preferably suspended from the lower surface 12b. In addition, the microphone 20 is preferably surrounded by a shock-absorbing insert 22, such as a standard reticulated polyester-polyurethane foam (available from Stevenson & Lawyer, Grand Rapids, Michigan), sized to fit within the microphone mounting cover 18. By suspending the microphone 20 from the housing 12 and surrounding the microphone 20 with the shock absorbing insert 22, the microphone 20 is insulated from vibrations from the housing 12. The microphone 20 is preferably a standard, commercially available, unidirectional back-electret microphone. An omni-directional microphone may be used but a unidirectional microphone is preferred because a unidirectional microphone may advantageously minimize interference from internal coupling from the back lobe of the microphone.

The microphone 20 is centered and retained within the microphone mounting cover 18 by the insert 22. The insert 22 is of a shape complementary to the microphone mounting cover 18. In a preferred embodiment, the microphone mounting cover 18 is a hemispherical cage and the insert 22 is substantially conical, because of the difficulty in shaping the reticulated polyester polyurethane foam to a hemispherical shape. The microphone 20 fits inside a cavity 29 in the insert 22. The size of the cavity 29 shown in FIG. 6 is slightly exaggerated to allow for illustration of the cavity 29. In practice, the cavity 29 would be of a size that allows the insert 22 to tightly retain the microphone 20. The combination of the insert 22, the tube 28 and the cover 18 acts to suspend and insulate the microphone 20 from any vibrations that may be transferred through the housing, either from the speaker or from the support surface 14.

Although FIGS. 1–6 depict the upper surface 12a of the speakerphone 10, the upper surface 12a is included for illustration purposes only. Other shapes and features may alternatively be provided.

While the invention has been described with relation to certain presently preferred embodiments, it is understood that the invention as expressed in the claims is not limited to those described preferred embodiments. Those with skill in this art will recognize other modifications of the invention which will still fall within the scope of the invention, as expressed in the accompanying claims.

We claim:

1. A speakerphone, comprising:
   (a) a housing having an upper surface and a lower surface, with respect to a support surface, the lower surface of the housing having a domed configuration;
   (b) the housing spaced from the support surface by support members;
   (c) a speaker situated to direct its output upwards through the upper surface of the housing; and
   (d) a downward-oriented microphone on the lower surface of the housing, located substantially at the highest point of the domed lower surface.

2. The speakerphone of claim 1, wherein the domed lower surface is substantially parabolic.

3. The speakerphone of claim 1, wherein the domed lower surface is defined by two orthogonal parabolas.

4. The speakerphone of claim 3, wherein one parabola is defined by the equation $y=x^2/25.26"$ and the other parabola is defined by the equation $y=x^2/12.32"$.

5. The speakerphone of claim 1, wherein the downward-oriented microphone is suspended from the lower surface of the housing.

6. The speakerphone of claim 5, further comprising:
   (a) a microphone mounting cover connected to the lower surface;
   (b) a spacer connected between the lower surface and the microphone to locate the microphone a predetermined distance from the housing; and
   (c) an insert that surrounds the microphone and the spacer, the insert being contained within the mounting cover.

7. The speakerphone of claim 6, wherein the microphone mounting cover is removably affixed to the lower surface of the housing and the insert is elastic.

8. A speakerphone, comprising:
   (a) a housing having a vertical axis, the housing spaced from a support surface by support members, the housing having an upper surface and a substantially parabolic domed lower surface;
   (b) an upward-oriented speaker located beneath the upper surface of the housing; and
   (c) a downward-oriented microphone, located on the parabolic domed lower surface, wherein the speaker and the microphone align with the vertical axis of the housing.

9. The speakerphone of claim 5, wherein the microphone is unidirectional.

10. The speakerphone of claim 5, wherein the lower surface is textured.

11. The speakerphone of claim 5, further comprising:
   (a) a microphone mounting cover, the cover removably mounted to the lower surface of the housing;
   (b) a spacer that is located adjacent to the lower surface and an outer end that is located adjacent to the microphone; and
   (c) a shock absorbing insert that surrounds the microphone and the spacer, the insert being contained by the mounting cover.

* * * * *